(12) United States Patent
Bigras et al.

(10) Patent No.: US 9,344,182 B2
(45) Date of Patent: May 17, 2016

(54) SATELLITE SYSTEM AND METHOD FOR CIRCUMPOLAR LATITUDES

(75) Inventors: Andre E. Bigras, Ottawa (CA); Peter Megyeri, Ottawa (CA); Jack Rigley, Ottawa (CA); Alireza Shoamanesh, Ottawa (CA); Paul Ng, Manotick (CA); Surinder Pal Singh, Ottawa (CA)

(73) Assignee: TELESAT CANADA, Ottawa (CA)

( * ) Notice: Subject to any disclaimer, the term of this patent is extended or adjusted under 35 U.S.C. 154(b) by 107 days.

(21) Appl. No.: 13/876,678

(22) PCT Filed: Sep. 30, 2011

(86) PCT No.: PCT/CA2011/001093
§ 371 (c)(1),
(2), (4) Date: Sep. 9, 2013

(87) PCT Pub. No.: WO2012/040828
PCT Pub. Date: Apr. 5, 2012

(65) Prior Publication Data
US 2014/0017992 A1    Jan. 16, 2014

(30) Foreign Application Priority Data

Oct. 1, 2010   (CA) .................................... 2716174

(51) Int. Cl.
*H04W 4/00*    (2009.01)
*H04B 7/185*   (2006.01)
(Continued)

(52) U.S. Cl.
CPC .......... *H04B 7/18519* (2013.01); *B64G 1/1085* (2013.01); *B64G 1/242* (2013.01);
(Continued)

(58) Field of Classification Search
USPC ............. 455/3.03, 12.1, 13.2, 98, 427, 404.1, 455/404.2, 456.1; 701/213; 244/158.1, 244/158.4, 158.6
See application file for complete search history.

(56) References Cited

U.S. PATENT DOCUMENTS 5,267,167 A * 11/1993 Glickman ...................... 701/531
5,619,211 A *  4/1997 Horkin ............... H04B 7/18508
                                                           342/352

(Continued)

FOREIGN PATENT DOCUMENTS

CN      1190297 A    8/1998
CN      1270304 A    10/2000

(Continued)

OTHER PUBLICATIONS

Notification of the First Office Action dated Dec. 3, 2014, The Patent Office of the People's Republic of China in related CN application 201180047754.7—Original and English language translation.

(Continued)

*Primary Examiner* — Dominic E Rego
(74) *Attorney, Agent, or Firm* — Young Law Firm, P.C.

(57) ABSTRACT

The present invention relates to satellite systems and more particularly, to the provision of a satellite system for weather and climate monitoring, communications applications, and scientific research at higher latitudes, referred to as the circumpolar region and defined here as the area with latitudes greater than 60°, in either the northern hemisphere or the southern hemisphere. Contrary to the teachings in the art it has been discovered that a satellite system and method may be provided using satellites in 24 sidereal hour orbits (geosynchronous) with inclinations (70° to 90°), orbital planes, right ascensions and eccentricities (0.275-0.45) chosen to optimize coverage of a particular service area located at high latitudes. A constellation of two satellites can provide continuous coverage of the circumpolar region. The satellites in this orbit avoid most of the Van Allen Belts.

24 Claims, 12 Drawing Sheets

(51) Int. Cl.
*H04B 7/195* (2006.01)
*B64G 1/24* (2006.01)
*B64G 1/00* (2006.01)
*B64G 1/10* (2006.01)
*B64G 3/00* (2006.01)
*B64G 1/64* (2006.01)

(52) U.S. Cl.
CPC ............... *H04B 7/195* (2013.01); *B64G 1/002* (2013.01); *B64G 1/007* (2013.01); *B64G 1/105* (2013.01); *B64G 1/1007* (2013.01); *B64G 1/1021* (2013.01); *B64G 3/00* (2013.01); *B64G 2001/643* (2013.01)

(56) References Cited

U.S. PATENT DOCUMENTS

| | | | | |
|---|---|---|---|---|
| 5,669,585 | A * | 9/1997 | Castiel et al. | 244/158.4 |
| 6,102,335 | A * | 8/2000 | Castiel et al. | 244/158.4 |
| 6,328,264 | B1 * | 12/2001 | Maeda | B64G 1/1007 244/158.4 |
| 6,333,924 | B1 * | 12/2001 | Porcelli | H04B 7/195 342/356 |
| 6,564,053 | B1 * | 5/2003 | Briskman et al. | 455/427 |
| 6,633,745 | B1 * | 10/2003 | Bethscheider | H04B 7/18521 455/12.1 |
| 6,695,259 | B1 * | 2/2004 | Maeda | B64G 1/1007 244/158.4 |
| 6,764,049 | B1 * | 7/2004 | Maeda | B64G 1/1007 244/158.4 |
| 6,990,314 | B1 * | 1/2006 | Hagen et al. | 455/13.1 |
| 9,075,140 | B2 * | 7/2015 | Garrison | G01S 19/27 1/1 |
| 2001/0014842 | A1 * | 8/2001 | Cellier | H04B 7/195 701/13 |
| 2002/0072361 | A1 * | 6/2002 | Knoblach et al. | 455/431 |
| 2002/0082776 | A1 | 6/2002 | Castiel | |
| 2002/0177403 | A1 * | 11/2002 | LaPrade et al. | 455/12.1 |
| 2003/0189136 | A1 * | 10/2003 | Maeda | B64G 1/1007 244/158.4 |
| 2003/0220106 | A1 * | 11/2003 | Dhillon | 455/430 |
| 2004/0137842 | A1 * | 7/2004 | Iwata et al. | 455/12.1 |
| 2004/0211864 | A1 * | 10/2004 | Less et al. | 244/158 R |
| 2005/0014499 | A1 * | 1/2005 | Knoblach et al. | 455/431 |
| 2005/0098686 | A1 | 5/2005 | Goodzeit | |
| 2006/0240767 | A1 * | 10/2006 | Jacomb-Hood et al. | 455/12.1 |
| 2007/0165677 | A1 * | 7/2007 | Monnerat et al. | 370/509 |
| 2008/0099625 | A1 * | 5/2008 | Yocom | 244/158.4 |
| 2008/0155610 | A1 * | 6/2008 | Rosen | H04N 7/20 725/64 |
| 2013/0062471 | A1 * | 3/2013 | Lim et al. | 244/158.6 |

FOREIGN PATENT DOCUMENTS

| | | |
|---|---|---|
| EP | 1720266 A1 | 11/2006 |
| JP | 5-268131 | 10/1993 |
| JP | 2000115050 A | 4/2000 |
| JP | 2001506465 | 5/2001 |
| JP | 2003298488 A | 10/2003 |
| JP | 2009227019 A | 10/2009 |
| WO | 03/061141 A2 | 7/2003 |
| WO | 03061141 A2 | 7/2003 |

OTHER PUBLICATIONS

International Search Report of Nov. 8, 2011 in PCT/CA2011/001093.

International Preliminary Report on Patentability of Apr. 2, 2013 in PCT/CA2011/001093.

Chobotov, Vladimir A., Orbital Mechanics (3rd Edition), American Institute of Aeronautics and Astronautics, 2002, ISBN: 978-1-56347-537-5, pp. 411-452.

Ley, Wilfried, Wittmann, Klaus, Hohmann, Willi, Handbook of Space Technology. John Wiley & Sons, 2009, ISBN: 978-0-470-69739-9, pp. 534-546.

Griffin, Michael D., French, James R., Space Vehicle Design (2nd Edition), American Institute of Aeronautics and Astronautics, 2004, ISBN: 978-1-56347-539-9, pp. 17 to 47.

English Translation of Office Action dated on or about Jan. 5, 2013 in Pakistan patent application 712/2011.

First Examination Report of Dec. 10, 2013 from the New Zealand Intellectual Property Office in related application, IP No. 608940.

Australian Office Action of Sep. 16, 2015 in AU 2011306037.

Japanese Office Action of Aug. 14, 2015 in JP 2013-5313500.

Eurasian Office Action of Jul. 27 2015 in Eurasian Patent Application 201390511.

CN Office Action of Oct. 10, 2015 in CN Patent Application 201180047754.7.

* cited by examiner

SATELLITE SYSTEM AND METHOD FOR CIRCUMPOLAR LATITUDES

CROSS REFERENCE TO RELATED APPLICATIONS

The present application is a §371 US National Phase application of PCT/CA2011/001093 filed on Sep. 30, 2011, which claims priority to CA 2,716,174 filed on Oct. 1, 2010, which are hereby incorporated herein in their entirety.

FIELD OF INVENTION

The present invention relates to satellite systems and more particularly, to die provision of a satellite system and method for weather and climate monitoring, communications applications, scientific research and similar tasks at higher latitudes, in either the northern hemisphere or the southern hemisphere.

BACKGROUND OF THE INVENTION

Meteorological monitoring satellites and communications satellites are usually located in Geostationary Earth Orbit—(GEO) or Low Earth Orbit (LEO). GEO satellites appear to be motionless in the sky, providing the satellite with a continuous view of a given area on the surface of the Earth. Unfortunately, such an orbit can only be obtained by placing the satellite directly above the Earth's equator (0° latitude), with a period equal to the Earth's rotational period, an orbital eccentricity of approximately zero and at an altitude of 35,789 km. While such orbits are useful in many applications, they are very poor at covering higher latitudes (not very useful above 60° latitude for weather and climate monitoring nor above 70° latitude for reliable mobile communications). The optical sensors on a GEO meteorological monitoring satellite, for example, would view higher latitudes at such a poor angle (i.e. a low "elevation angle") that it could not collect useful data. GEO communications satellite links become unreliable or fail as the elevation angle to the satellite decreases with increasing latitude.

Low Earth Orbit (LEO) satellites are placed in circular orbits at low altitudes (less than 2,000 km) and can provide continuous coverage of the circumpolar region but this requires many satellites as each one is over the region for a relatively small amount of time. One operational example is the Iridium system which uses a constellation of 66 satellites. While practical for relatively low bandwidth communications, it is not cost effective for broadband communications or for weather and climate monitoring which require large and expensive payloads to be placed on each satellite. In view of the cost of building, launching and maintaining each satellite this is a very expensive way of providing continuous satellite coverage of a specific geographic area.

Highly Elliptical Orbits (HEO) such as the Molniya and the classic Tundra orbits can provide better converge of high, latitudes with fewer satellites, but both orbits are problematic.

Highly Elliptical Orbits (HEO) are those in which one of the foci of the orbit is the centre of the Earth. The speed of a satellite in an elliptical orbit is a declining function of the distance from the focus. Arranging the satellite to travel close to the Earth during one part of its orbit (the perigee) will cause it to travel very quickly at that time, while at the other end of the orbit (the apogee), it will travel very slowly. A satellite placed in these orbits spends most of its time over a chosen area of the Earth, a phenomenon known as "apogee dwell". The satellite moves relatively slowly over the areas of interest, and quickly over areas that are not of interest.

The orbital plane of a HEO is inclined with respect to the Earth's equator. An inclination close to 63.4° is chosen in order to minimize the requirement for the satellite on-board propulsion system to maintain the apogee above the service area.

The Molniya orbit is a HEO with an orbital period of approximately 12 hours. The altitude at the perigee of a Molniya orbit is low (on the order of 500 km above the Earth's surface) and the orbit passes through the Van Allen Belts. The Van Allen Belts are belts of energetic charged particles (plasma) around the Earth, which are held in place by Earth's magnetic field. Solar cells, integrated circuits and sensors are damaged by the radiation levels in these belts, even if they are "hardened" or other safety measures are implemented, for example, turning sensors off when passing through regions of intense radiation. Despite these efforts, satellites which may otherwise have a 15 year expected life will only have about a 5 year life if they have to travel regularly through the inner Van Allen belt of high energy protons (the outer belt of electrons is less problematic). This shortened life of satellites makes Molniya systems very expensive.

The classic Tundra orbit is also a Highly Elliptical Orbit, with the same inclination as Molniya (63.4°). It is also a geosynchronous orbit with an orbital period of one sidereal day (approximately 24 hours). The only operational system in Tundra orbit is Sirius Satellite Radio, which operates a constellation of three satellites in different planes, each satellite plane being offset by 120°, to provide the coverage they desire for their broadcast radio system. Two satellites in a classic Tundra orbit could not provide continuous coverage of a circumpolar region.

Even in view of the problems with the Molniya (short design life) and the classic Tundra systems (requiring more than two satellites for circumpolar coverage), the experts in the field support the use of these systems in such applications. For example:

A current NASA paper ("*The case for launching a meteorological imager in a Molniya orbit*" by Lars Peter Riishojgaard, Global Modeling and Assimilation Office), asserts that the most effective way of providing a satellite system for meteorological monitoring at higher latitudes, is to use a Molniya system:

http://www.wmo.int/pages/prog/www/OSY/Meetings/ODRRGOS-7/Doc7-5 (1).pdf

A European Space Agency paper ("HEO for ATM; SATCOM for AIR TRAFFIC MANAGEMENT by HEO satellites". Final Report, 2007) concludes that a Tundra orbit would take more satellites than Molniya, for coverage of northern latitudes for Air Traffic Management (ATM) applications; and A presentation at International Communications, Navigations and Surveillance Conference, 2009, "*SATCOM for ATM in High Latitudes*", Jan Erik Hakegard, Trond Bakken, Tor Andre Myrvoll, concludes that three satellites in Tundra orbit would be required for ATM at high latitudes. See: http://i-cns.org/media/2009/05/presentations/Session_K_Communications_FCS/01-Hakegard.pdf There is therefore a need for an improved satellite system and methods for providing coverage of high latitudes, particularly for meteorological monitoring and communications applications.

SUMMARY OF THE INVENTION

It is an object of the invention to provide an improved satellite system and methods for providing continuous coverage of the circumpolar region, which mitigates upon the problems described above.

Contrary to the teachings in the art it has been determined that a satellite system and method may be provided using satellites in 24 sidereal hour orbits (geosynchronous) with inclinations, orbital planes, right ascensions and eccentricities chosen to optimize coverage of a particular service area located at high latitudes. A constellation of two satellites can provide continuous coverage of the circumpolar region. The satellites orbits avoid the inner Van Allen belt of high energy protons and can achieve a design life of 15 years or greater.

In one embodiment of the invention there is provided a satellite system for Earth observation and communications, comprising: a constellation of two satellites, which together provide continuous coverage of approximately 20° elevation or greater throughout a geographic Service area above 60° latitude; each satellite having an orbital inclination approximately between 70° and 90° and an orbital eccentricity approximately between 0.275 and 0.45; and a base station for transmitting to, and receiving signals from, said constellation of two satellites.

In another embodiment of the invention there is provided a method of operation for a satellite system satellite system for Earth observation and communications, comprising: providing a constellation of two satellites, which together provide continuous coverage of approximately 20° elevation or greater throughout a geographic service area above 60° latitude, each satellite having an orbital inclination approximately between 70° and 90° and an orbital eccentricity approximately between 0.275 and 0.45; and providing a base station for transmitting to and receiving signals from said constellation of two satellites.

In a further embodiment of the invention there is provided a satellite base station, comprising: communication means for transmitting and receiving signals to and from a constellation of two satellites, which together provide continuous coverage of approximately 20° elevation or greater throughout a geographic service area above approximately 60° latitude; and flight control means for controlling orbits of said constellation of two satellites, each satellite having an orbital inclination approximately between 70° and 90° and an orbital eccentricity approximately between 0.275 and 0.45.

In a still further embodiment of the invention there is provided a satellite comprising: communication means for transmitting and receiving signals to and from a base station; an Earth observation and communications payload for serving a geographic service area above 60° latitude, with an elevation of approximately 20° or greater; and flight control means for controlling an orbit to have an orbital inclination approximately between 70° and 90° and an orbital eccentricity approximately between 0.275 and 0.45.

Other aspects and features of the present invention will be apparent to those of ordinary skill in the art front a review of the following detailed description when considered in conjunction with the drawings.

BRIEF DESCRIPTION OF THE DRAWINGS

These and other features of the invention will become more apparent from the following description in which reference is made to the appended drawings wherein.

Similar reference numerals have been used in different figures to denote similar components.

DETAILED DESCRIPTION

Figure 1:
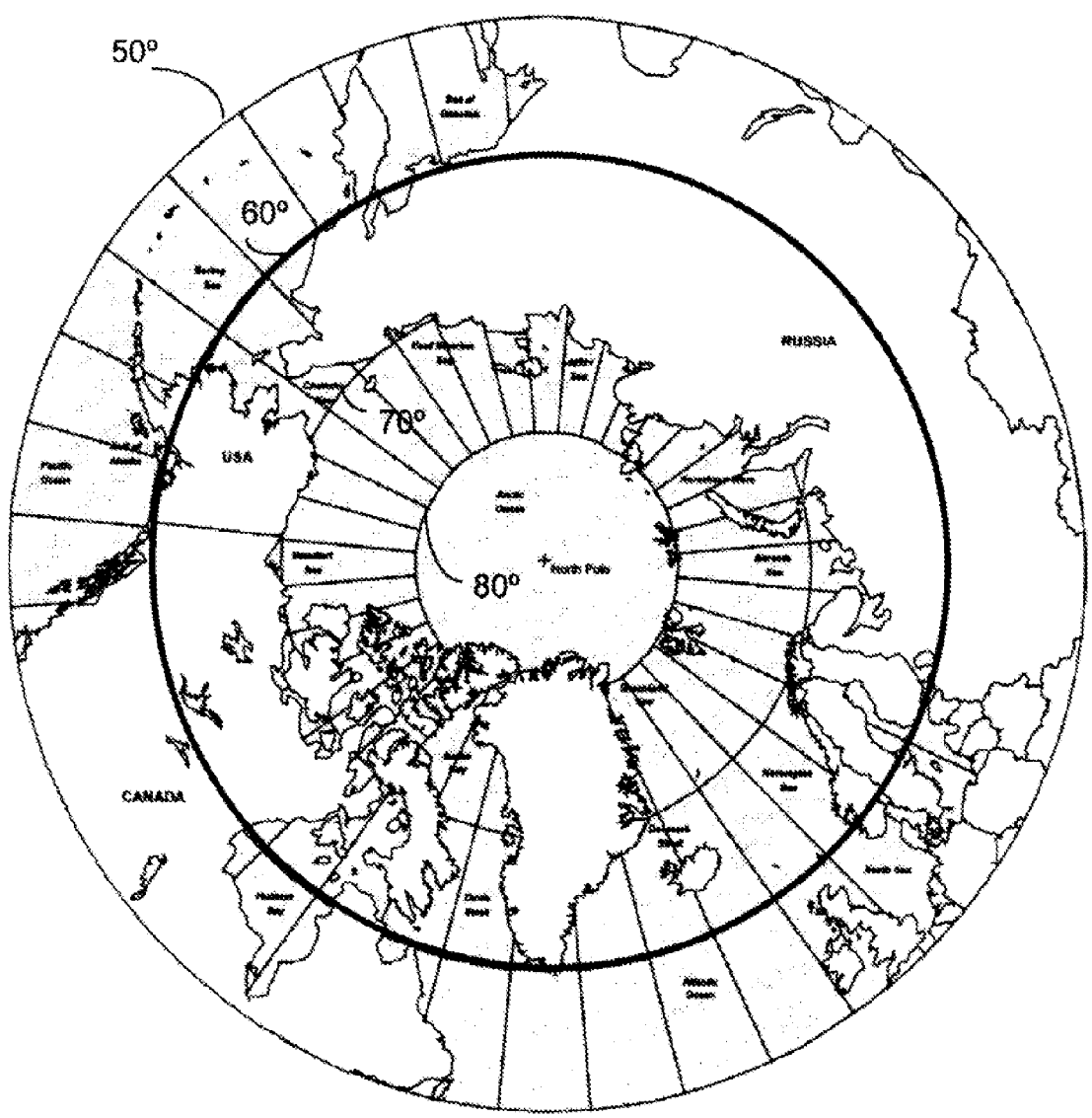
FIG. 1 presents a map of the geographic area to be covered, in this example for the northern hemisphere, the area above 60° north.

Contrary to the teachings in the art it has been determined mat a satellite system and method may be provided using satellites in 24 sidereal hour orbits, (geosynchronous) with inclinations, orbital planes, right ascensions and eccentricities chosen to optimize coverage of a particular service area located at high latitudes, A constellation of two satellites can provide continuous coverage of the circumpolar region, which is defined as the area with greater than 60° latitude in either the northern or southern hemispheres (see FIG. 1, which identifies the 60° latitude area of the northern hemisphere). The satellites in this orbit avoid the inner Van Allen belt, of high energy protons.

Figure 2:
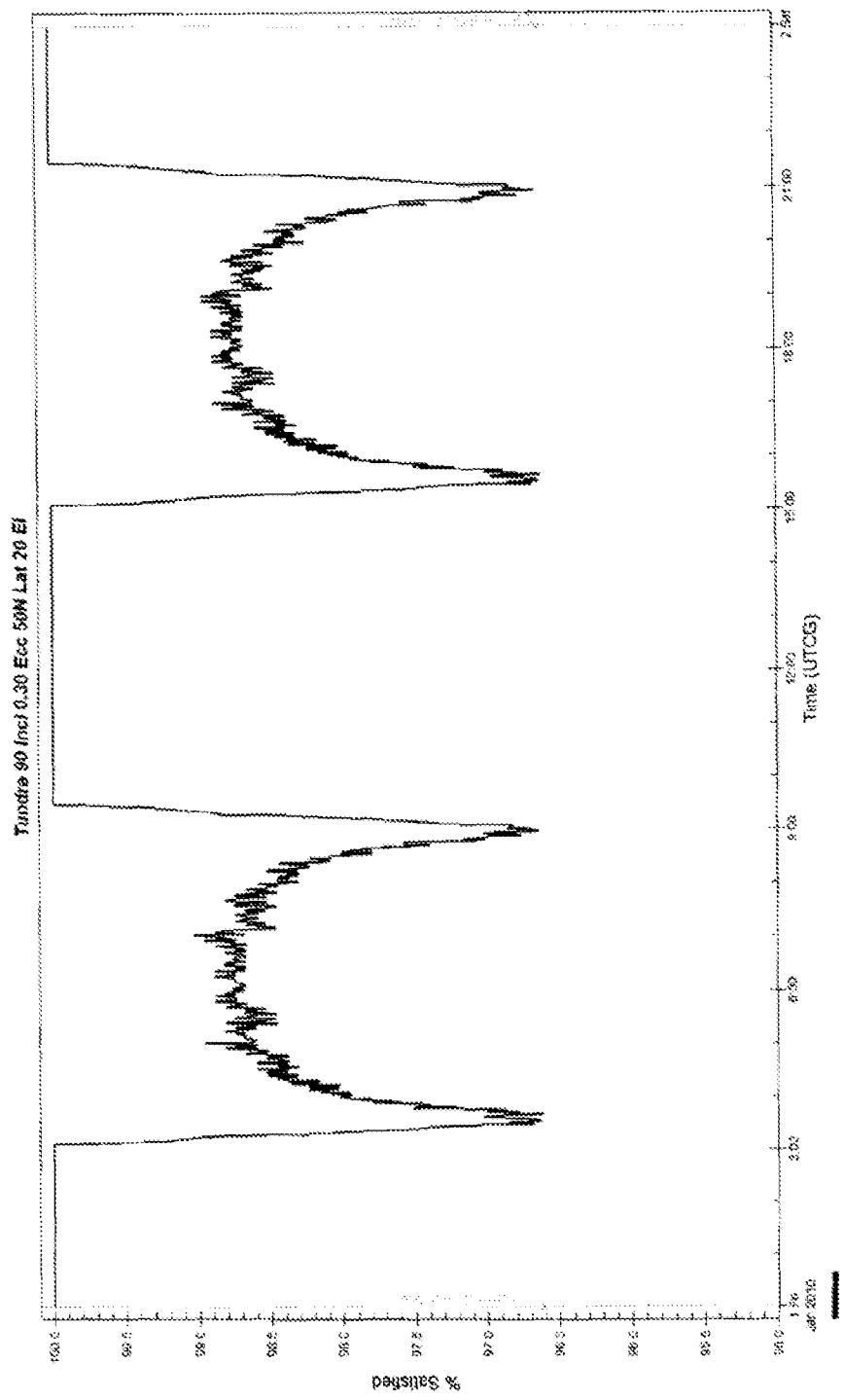
FIG. 2 shows the output plot of a satellite orbit software tool, indicating the percentage of time the criterion of a minimum 20° elevation angle is met throughout the area. In this example the northern hemisphere above a latitude of 50° north is shown to have slightly less than 100 percent coverage. The graph of percent coverage of the area above 60° indicates 100 percent coverage.

For example, as shown in FIG. 2, a constellation of two satellites at a 90° inclination and 0.3 eccentricity, will provide a minimum 20° elevation angle for the entire area above 50° North, for much of the time, with the percentage area coverage at a minimum 20° elevation angle never less than 96.5%. The "elevation angle" refers to the line-of-sight angle between the ground and the satellite as measured from the horizon. The minimum elevation angle that weather and climate monitoring instruments must have for accurate data is typically in the vicinity of 20°. Other exemplary embodiments of the invention are described hereinafter.

Figure 3:
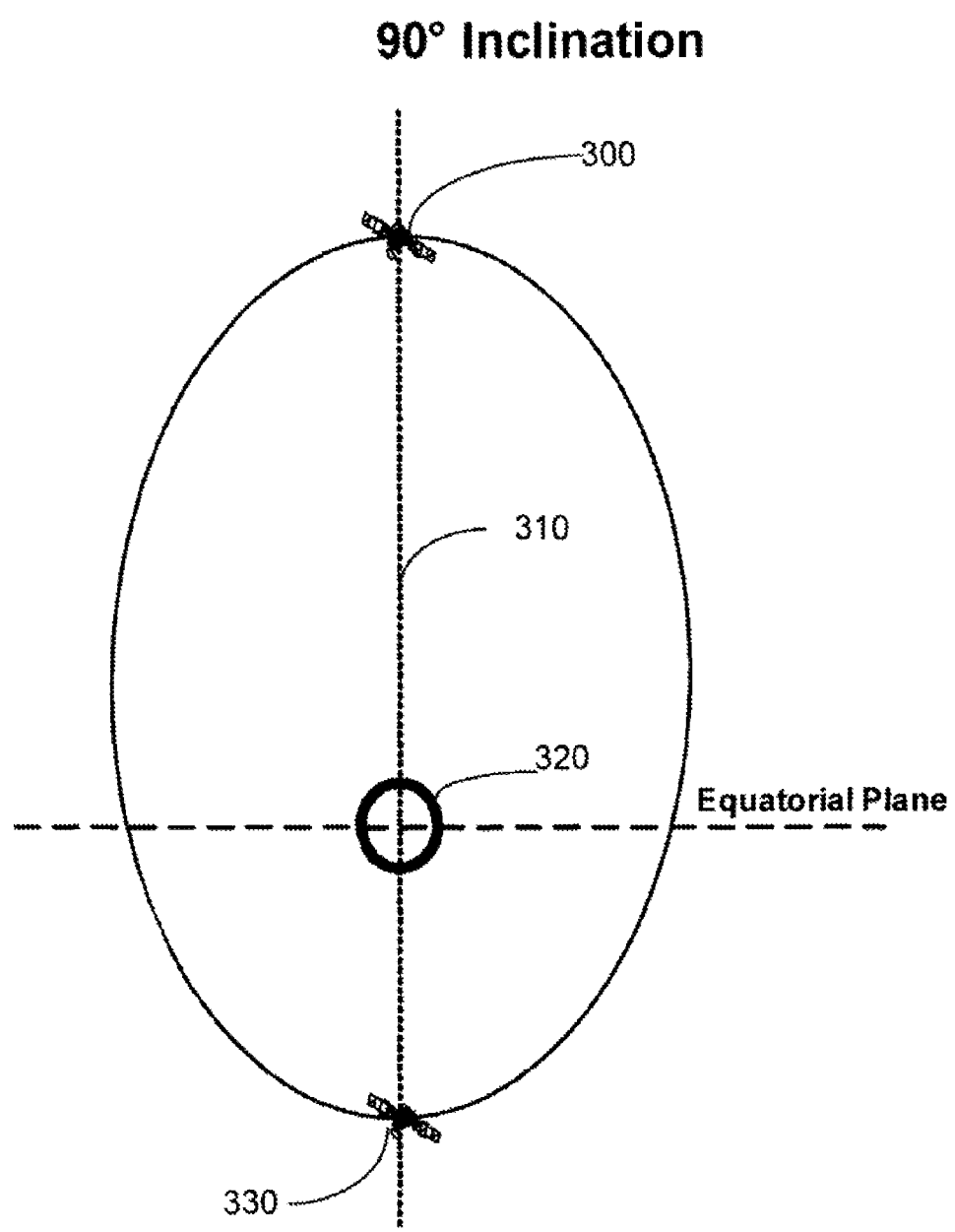
FIG. 3 shows two satellites in an exemplary 24 hour elliptical orbit, inclined 90°. The satellites are in the some plane separated by approximately 12 hours.

The classic Tundra system does not provide continuous coverage of the circumpolar region. By increasing the eccentricity, causing a higher apogee, the coverage requirement may be met. However, greater altitude above the coverage area requires larger antennas and sensors on the satellite. More importantly, the perigee is lowered causing the satellites to pass through a greater portion of the Van Allen belts, reducing then operational life. It is only by modifying both the eccentricity and the inclination, that one is able to provide the desired circumpolar region coverage at a reasonable altitude, with minimal exposure to the Van Allen belts. Other parameters of the system are as follows;

Inclination: The inclination is the angle between the orbital plane of the satellites, and the plane that passes through the Earth's equator. The inclination may only be slightly greater than 63.4° in some embodiments but is between 80° and 90° for most applications requiring circumpolar coverage. FIG. 3 shows a simplified diagram of two satellites, 180° apart, in a HEO orbit with an inclination of 90°. One satellite 300 is at the apogee of the orbit, passing through the axis 310 of the Earth 320 in the northern hemisphere, while the second satellite 330 is at the perigee, passing through the axis 310 in the southern hemisphere.

Eccentricity: The eccentricity is the shape of the elliptical path of the satellites, which dictates the altitude of the apogee (the highest altitude) and the perigee (the lowest altitude). The eccentricity is chosen to have a sufficiently high apogee over the service area so the satellites are able to provide the necessary coverage for the required period of its orbit. Higher eccentricity increases the altitude of the apogee, which must be overcome with greater power, antenna gain or larger optics on the satellite. Higher eccentricities (above approximately 0.34), also increase exposure to the Van Allen belts.

Figure 4:
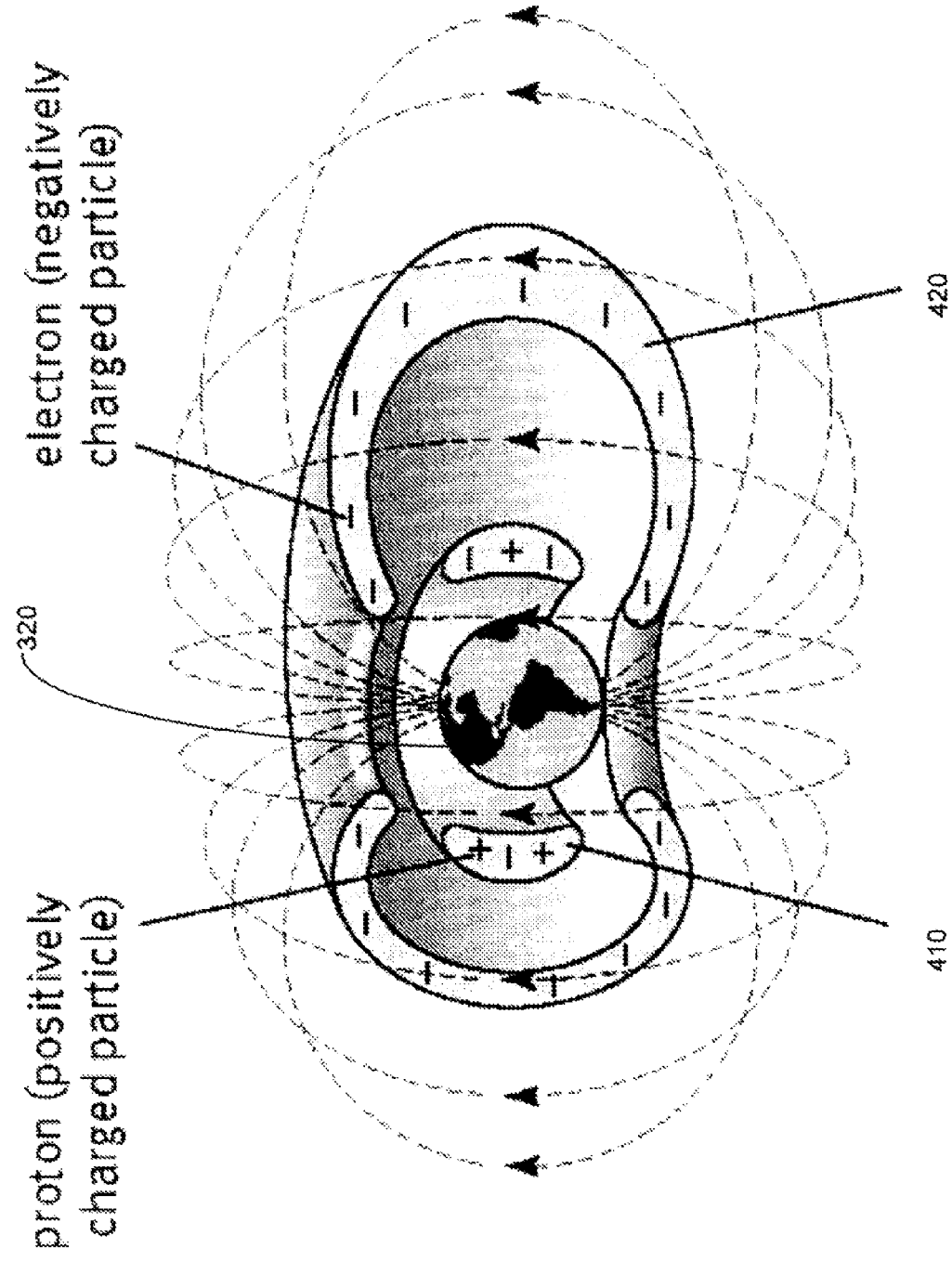
FIG. 4 is a simplified diagram of the Van Allen radiation belts, indicating the inner proton belt and the outer electron belt.

Altitude: It is desirable to have as low an apogee as possible above the coverage area as increased range negatively impacts the required power and/or sensitivity of the satellite instruments. At the perigee of course, a sufficiently high altitude must be achieved to minimize exposure to the Van Allen Belts. As shown in FIG. 4, the Van Allen belts comprise a torus of fields around the Earth 320. The belts of greatest concern are the inner belts of charged protons 410. As will be explained, the outer belts of elections 420 are of less concern.

Place/Number of Satellites: One orbital plane with two or more satellites is the preferred implementation. This allows for multiple satellites launched from a single launch vehicle, or increasing the number of satellites in the same plane for redundancy and/or improved performance. For example, while only two satellites are required, it may be desirable to launch a redundant third satellite in case one satellite fails. Because all three satellites are in the same plane, it is easier to place into proper position and activate the third satellite when required. This kind of redundancy cannot be done in systems which use different orbital planes for their satellites.

Argument of Perigee: The Argument, of Perigee describes the orientation of an elliptical orbit with respect to the equatorial plane of the Earth. For service to the north circumpolar region (e.g. latitudes greater than 60° North), the argument of the perigee is in the vicinity of 270° so that the apogee is in the northern hemisphere and the perigee is in the southern hemisphere. For service to the south circumpolar region (e.g. latitudes greater than 60° South), the argument of the perigee is in the vicinity of 90° so that the apogee is in the southern hemisphere and the perigee is in the northern hemisphere.

Longitude of the Ascending Node: In simple terms, the Longitude of the Ascending Node describes where the orbital plane crosses the Earth's equator. The Longitude of the Ascending Node becomes a factor in specifying the orbit if one wants to bias the coverage towards a subset of the circumpolar region, or to optimize a satellite's observation of the Earth for a situation with better sunlight illumination, as examples.

Orbital Period: The orbital period is preferably approximately 24 hours, but this orbit can be adjusted to provide the required coverage at periods above and below 24 horns and still achieve continuous coverage of the circumpolar region.

Figure 5:
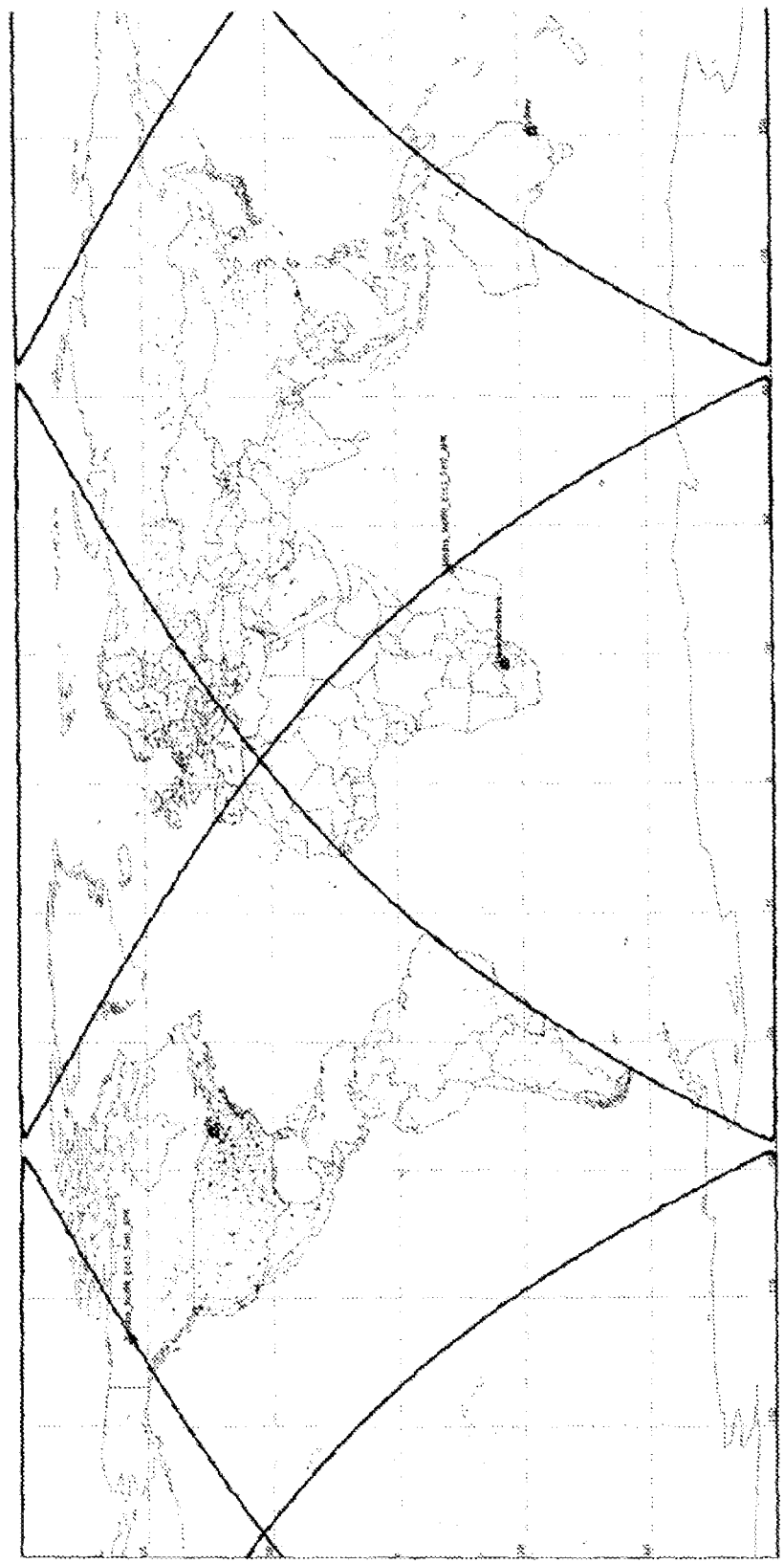
FIG. 5 depicts the ground trace of two satellites in the same orbital plane, in an embodiment of the invention. The ground trace is repeated daily.

Ground Trace: In the preferred embodiment the two satellites are in the same orbital plane and each repeatedly follow a different ground trace. For a two satellite constellation, the phasing, or spacing of the satellites in the orbital plane is such that the time between then respective apogees is approximately one half the orbital period. See FIG. 5 which shows the ground traces for an exemplary embodiment of two satellites in the same plane, with an inclination of 90° and an eccentricity of 0.3.

Orbit Control: Satellite constellations of the invention experience changes in the aforementioned orbital parameters over time due the Earth's oblateness, gravitational forces of the sun and moon, and solar radiation pressure. These can be compensated by the satellite's on-board propulsion system. The manner is which this is done, is described hereinafter.

Figure 6:
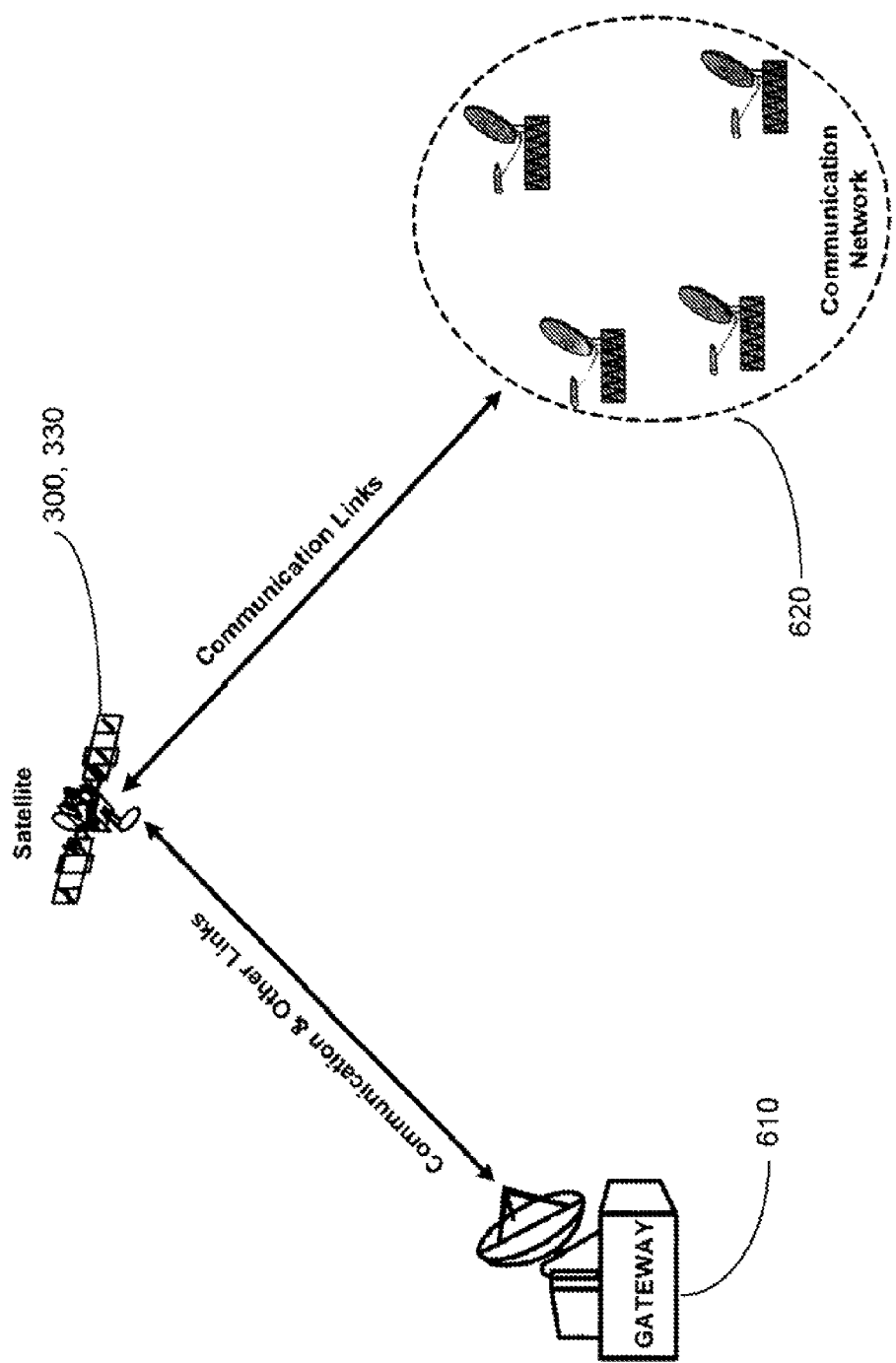
FIG. 6 presents an exemplary network architecture for implementing the invention.

Base Stations: As shown in FIG. 6, the system includes a ground based communications network 620, satellites 300, 330 with communications functionality, Earth observation and or science payloads, and at least one base station or Gateway 610. The base station or Gateway 610 is required to obtain data from the satellites 300, 330 and to effect Telemetry, Tracking & Control (TTC). Directional antennas would be used because of their greater efficiency, requiring the base station(s) 610 to back the satellites 300, 330 across the sky. Tracking technology is well known in the art, though it would have to be modified to accommodate the two satellite system of the invention. Handoff from one satellite to the next as they move across the sky, would not require any interaction for the user. Handoff can be affected using known techniques, though they would have to be optimized for this implementation.

Real time two-way communications is possible only when the satellite is mutually visible to both a Gateway 610 and an element of the ground based communications network 620. This network 620 consists of the fixed and mobile satellite terminals which communicate to the satellite. Downloading of data generated by the satellite payloads is possible only when the satellite is visible to a Gateway 610. It is feasible to increase the number of strategically placed Gateways 610 to achieve continuous links between a satellite 300, 330 and at least one Gateway 610. The satellites 300, 330 may also have "store and forward" functionality allowing the satellite to store SOE and other data when communications to a Gateway infrastructure is not possible. The stored data can then be relayed to the ground segment when communications is possible between the satellite and the Gateway.

Avoiding a large part of the Van Allen belts increases the design life of the satellites. By using this invention less frequent launches are required to replenish the satellite constellation and there are fewer restrictions in the design and operation of the communications. Earth observation and science payloads.

The flight dynamics (i.e. adjustments required to keep the satellite in the desired orbit) of the satellites in such a system would be different from those of other satellite systems, but the way in which these problems are handled would be much the same. That is, the flight path of the satellite could be disturbed, for example, by the gravitational pull of the moon and sun, solar radiation pressure and oblateness of the Earth. Computer software systems are known to manage other satellite flight systems and could easily be modified to accommodate the orbits described herein.

It is intended that the system initially be used in a two-way communication mode, in these satellite bands: L-Band (1-3 GHz); X band (approximately 7-8 GHz); Ku Band (approximately 11-15 GHz), and Ka Band (approximately 17-31 GHz). Error correction, encoding and re-transmission of lost/corrupted packets would also be used.

Advantages of the system include at least the following:
only two satellites are required, in contrast to three required by the classic Tundra systems, and many more required by LEO systems for full circumpolar coverage;

this system minimizes exposure to the Van Allen Belts, giving satellites a minimum 15 year life rather than the 5 year satellite life expected in a Molniya system;

the necessary continuous coverage of the circumpolar region for Earth observation and broadband communications can be provided, in contrast to GEO systems which cannot provide such coverage; and the altitude at perigee would be approximately 24,000 km, and non-continuous communications and Earth observation are possible at the other circumpolar region.

Various Embodiments

The main drivers for this invention can be summarized as follows:

Applications Science and Earth Observation (SEO) and Communication/Broadcast (COM)

Area of coverage required by the SEO and/or COM) payload

Minimum elevation angle required by the SEO and/or the COM payload

Percent of time coverage required from the SEO and COM payload

As shown in Table 1, the parameters for some exemplary embodiments of the invention would be as follows:

tricity in this application has been relaxed from 0.3 to 0.275. This is allowable because the COM application can accommodate a lower elevation angle than the SEO application. Advantages of the parameters for this embodiment include the following:

With a satellite dedicated to communications only (i.e. no SEO payload), a larger communications payload would be possible, allowing, as examples: greater capacity, redundancy, larger antennas or more frequency bands;

The size of the satellite may be reduced, decreasing total costs;

Possibility of a single launch for multiple satellites; and

Possibility of carrying more fuel hence longer satellite life cycle

Sub-Application 2 is the same as the Main application except that the apogee is placed over the South Pole which becomes the main service area.

Sub-Application 3 is the same as Sub Application 1 except that the apogee is placed over the South Pole which becomes the main service area. Of course, this application has the same advantages as Sub-Application 1.

While an inclination of 90° has been found to be advantageous, this parameter can be relaxed to an inclination range approximately from 70° to 90° as shown in Sub-Applications

TABLE 1

APPLICATIONS OF THE INVENTION

|  | Main Application | Sub Application-1 | Sub Application-2 | Sub Application-3 | Sub Application-4 | Sub Application-5 |
|---|---|---|---|---|---|---|
| Application | SEO & COM | COM | SEO & COM | COM | SEO & COM | SEO & COM |
| Coverage |  |  |  |  |  |  |
| Main | N. Pole | N. Pole | S. Pole | S. Pole | N. Pole | N. Pole |
| Secondary | S. Pole | S. Pole | N. Pole | N. Pole | S. Pole | S. Pole |
| Sat & Orbits |  |  |  |  |  |  |
| Satellites | 2 | 2 | 2 | 2 | 2 | 2 |
| Orbits | 1 | 1 | 1 | 1 | 1 | 1 |
| Inclination | 90° | 90° | 90° | 90° | 80°-90° | 70°-90° |
| Eccentricity | 0.3 | 0.275 | 0.3 | 0.275 | 0.3-0.34 | 0.3-0.45 |
| Design life | 15 yrs | 15 yrs | 15 yrs | 15 yrs | 15 yrs | 15 yrs |
| N-Pole SEO |  |  |  |  |  |  |
| Area Coverage > 60°N | 100% |  |  |  | 100% | 100% |
| Min SEO El | 20° |  |  |  | 20° | 20° |
| Time Coverage | 24 hrs |  |  |  | 24 hrs | 24 hrs |
| S-Pole SEO |  |  |  |  |  |  |
| Area Coverage > 60°N |  |  | 100% |  |  |  |
| Min SEO El |  |  | 20° |  |  |  |
| Time Coverage |  |  | 24 hrs |  |  |  |
| N-Pole COM |  |  |  |  |  |  |
| Area Coverage > 70°N | 100% | 100% |  |  | 100% | 100% |
| Time Coverage | 24 hrs | 24 hrs |  |  | 24 hrs | 24 hrs |
| Min Terminal. El | 10° | 10° |  |  | 10° | 10° |
| Min Gateway El | 5° | 5° |  |  | 5° | 5° |
| S-Pole COM |  |  |  |  |  |  |
| Area Coverage > 70°S |  |  | 100% | 100% |  |  |
| Time Coverage |  |  | 24 hrs | 24 hrs |  |  |
| Min Terminal. El |  |  | 10° | 10° |  |  |
| Min Gateway El |  |  | 5° | 5° |  |  |

Sub-Application 1 is for satellites for "communication only" services to the two Polar regions. Note that the eccen- 4 and 5. Even with the relaxation of this parameter, this application still provides the following advantages:

Coverage of entire circumpolar region above 60° is possible but the apogee must increase with decreasing inclination; e.g., an increase in apogee from 48,100 km to 50,100 km results from a decrease in inclination from 90° to 80°. Although 2,000 km is a small percentage difference, it is significant enough to make the 90° orbit preferable. The closer altitude will result in more accurate scientific data and better resolution from Earth observation equipment; and Satellites not inclined 90° can operate in different orbital planes making possible a single ground track.

Table 2 below, shows the minimum eccentricity (i.e. minimum apogee height) required to meet the circumpolar coverage requirement indicated for a range of orbit plane inclinations under Sub-Applications 4 and 5, and lower inclinations in general.

For this table, the circumpolar coverage requirement is defined as 100% of coverage for 100% of the time of the circumpolar region above 60° north (or below 60° south for the south circumpolar region) at a minimum elevation angle of 20° (equivalent to a maximum angle of incidence of 70°).

TABLE 2

ANALYSIS OF HIGH INCLINATIONS

| Inclination | Eccentricity | Apogee Height |
|---|---|---|
| 90° | 0.30 | 48435.2 km |
| 87° | 0.31 | 48856.8 km |
| 84° | 0.33 | 49700.1 km |
| 81° | 0.34 | 50121.8 km |
| 78° | 0 36 | 50965 km |
| 75° | 0.40 | 52651.6 km |
| 72° | 0.42 | 53494.9 km |
| 69° | 0.46 | 55181.4 km |

Lowering the inclination increases the required eccentricity. However, this results in an apogee height which will increase the path loss for a communications payload and reduce the resolution achieved by an Earth observation payload. Hence, for such applications, the range of approximately 80 to 90° inclination is preferred.

Increasing the eccentricity above a minimum required for a given inclination will increase the area which can be continuously covered, in this case to below the 60° latitude contour.

Orbit Control

Satellite constellations of this invention will experience changes in the aforementioned orbital parameters over time due to the Earth's oblateness, gravitational forces of the sun and moon, and solar radiation pressure. These can be compensated by performing periodic orbit-correction maneuvers using the satellite's on-board propulsion system. The primary parameter of concern is the Argument of Perigee.

For orbit inclinations greater than 63.4°, the argument of perigee will tend to change (decrease) at a fairly constant rate, due (primarily) to the Earth's oblateness. As the inclination increases from 63.4° to 90°, the rate of change of argument of perigee ($\omega$) increases. To maintain Service to the northern polar cap, the orbit apogee must be kept close to the most northerly point of the ground track (corresponding to $\omega=270°$); hence "stationkeeping" maneuvers will be performed to control the argument of perigee. These maneuvers will be similar to the double-burn east-west maneuvers that are performed to control the eccentricity of a geostationary satellite, but will be considerably larger.

The rate at which the argument, of perigee changes is a complex function of the orbit inclination, eccentricity, semi-major axis and right ascension of ascending node (RAAN).

Note that the classic Molniya orbit with an inclination of 63.4° is not exempt from argument of perigee changes due to the gravitational effects of the sun and moon; the Molniya argument of perigee may decrease by as much as 2°/year, depending on the RAAN. For the orbit of the invention the magnitude of the argument of perigee rate is larger. At an inclination of 63.4° the rate may exceed 6°/year, and at an inclination of 90° the rate is 8.3°/year.

A single correction to the argument of perigee may be applied by performing two "delta-v" maneuvers at opposite sides of the orbit roughly midway between the apogee and perigee ("delta-v" is merely an aerospace term for a change in velocity). With the maneuver that is performed as the satellite moves southward toward perigee, thrusters will be fired to provide a retrograde delta-v to reduce the orbit velocity, causing the argument of perigee to increase. With the maneuver that is performed as the satellite moves northward toward apogee, thrusters will be fired to provide a prograde delta-v to increase the orbit velocity, which will also increase the argument of perigee. The two maneuvers will be performed one half-orbit apart; the order in which the maneuvers are performed will not matter. The velocity changes of the two maneuvers will be roughly equal to avoid unwanted changes to the orbit period.

The size of each argument of perigee correction will be determined by the thrust and duration of the two maneuvers. Because longer maneuvers are less efficient, it will be preferable to perform frequent, short-duration maneuvers rather than less-frequent, long-duration maneuvers. For satellites equipped with chemical (bi-propellant) propulsion systems, the achievable thrust will be large enough to allow several days or even weeks between maneuver pairs. For satellites utilizing high-efficiency, low-thrust ion thrusters, maneuvers may be performed during every orbit revolution.

Over time, if left uncontrolled the other orbit parameters will begin to wander away from their nominal values due to the perturbing forces of Earth oblateness and lunar/solar gravity. The two remaining "in-plane" classic orbital elements, semi-major axis and eccentricity, will tend to move quite slowly and erratically, and may be controlled with virtually zero additional propellant by slightly adjusting the locations and difference in magnitudes of the double-burn maneuvers that are performed to control the argument of perigee.

Of the two "out-of-plane" classic elements, the inclination will also tend to change quite slowly, and because it is not a critical parameter it will not need to be controlled. The RAAN, like the argument of perigee, will tend to change at a fairly constant rate, resulting in a slow but steady precession of the orbit plane about the North Pole. The sign and magnitude of the RAAN rate will determined by the inclination and initial RAAN value. For the preferred configuration with two or more satellites in the same orbit plane, the precession of the orbit plane will not affect the coverage of the polar region, so no maneuvers will be required to control the RAAN. (Note that the effect of a small, constant rate in the RAAN on the coverage at any point on the ground can be easily compensated for by slightly offsetting the average orbit period from exactly one sidereal day to maintain a fixed ground track). For a constellation in which satellites are maintained in two or more orbit planes, infrequent "cross-track" maneuvers may be performed at the orbit apogees to maintain the nodal separation between planes.

Radiation

Orbits selected for this invention allow the satellites to avoid the inner Van Allen radiation belt of high energy protons. The satellites in this orbit will still pass through the less severe outer radiation belt of electrons. Proton particles are much heavier than electron particles thus they can create much more damage. It is difficult if not impossible to shield against high energy protons.

As the satellite passes through these radiation zones, there is a cumulative radiation absorption by the satellite components. This accumulative absorption is one factor in determining the design life of a satellite. The second factor, which occurs as a result of the proton belt but not the electron belt is called the Single Event Effect (SEE) caused by a single energetic particle. The particle can cause a temporary upset in the electronics or permanent damage. The orbits of the invention have been specially designed to achieve circumpolar coverage with two satellites, while avoiding the Van Allen proton radiation belts.

Figure 7:
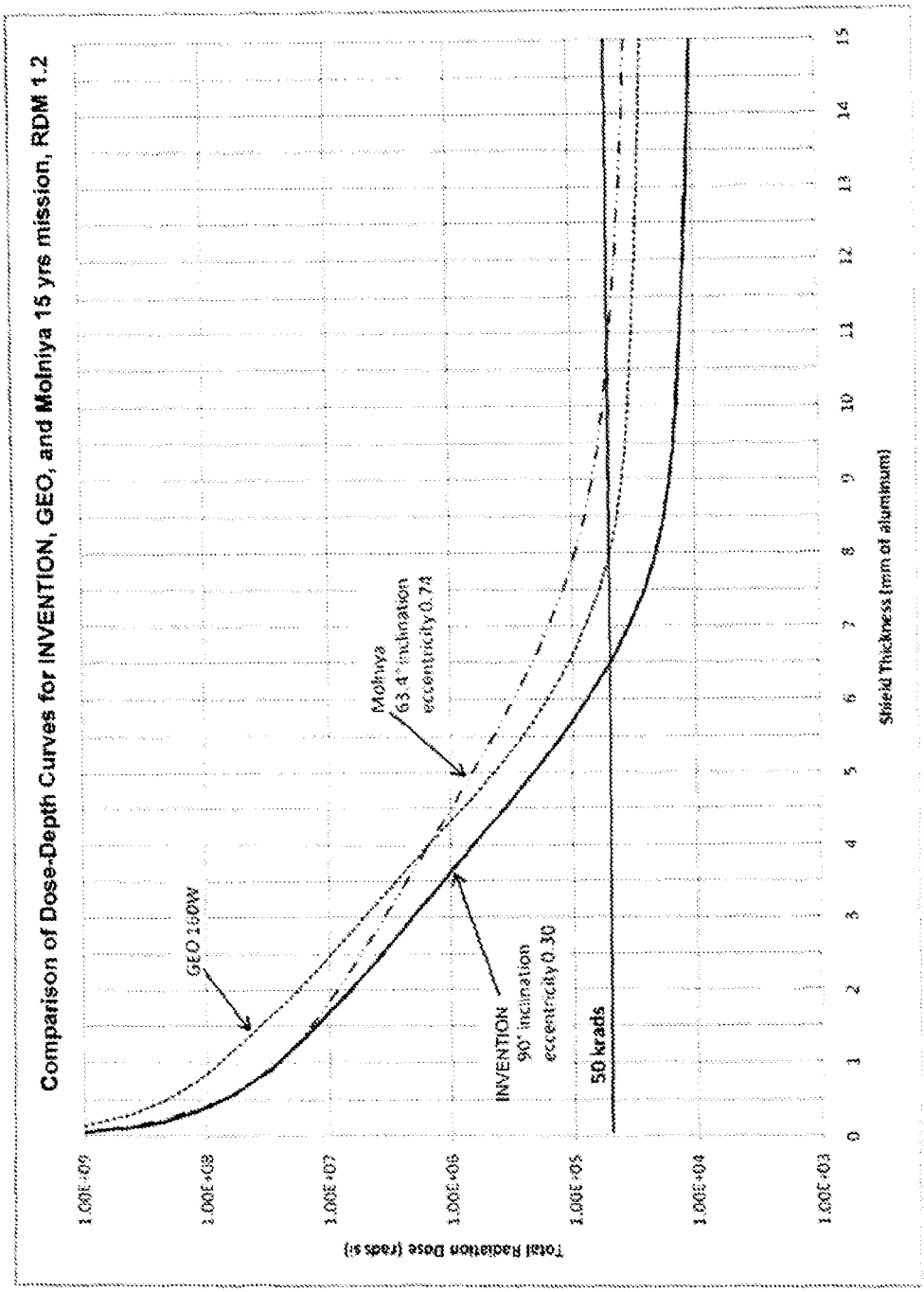
FIGS. 7 and 8 are graphs which show the Total Ionizing Dose (TID) for the orbit of the invention to be less than those of geostationary and Molniya orbits.
Figure 8:
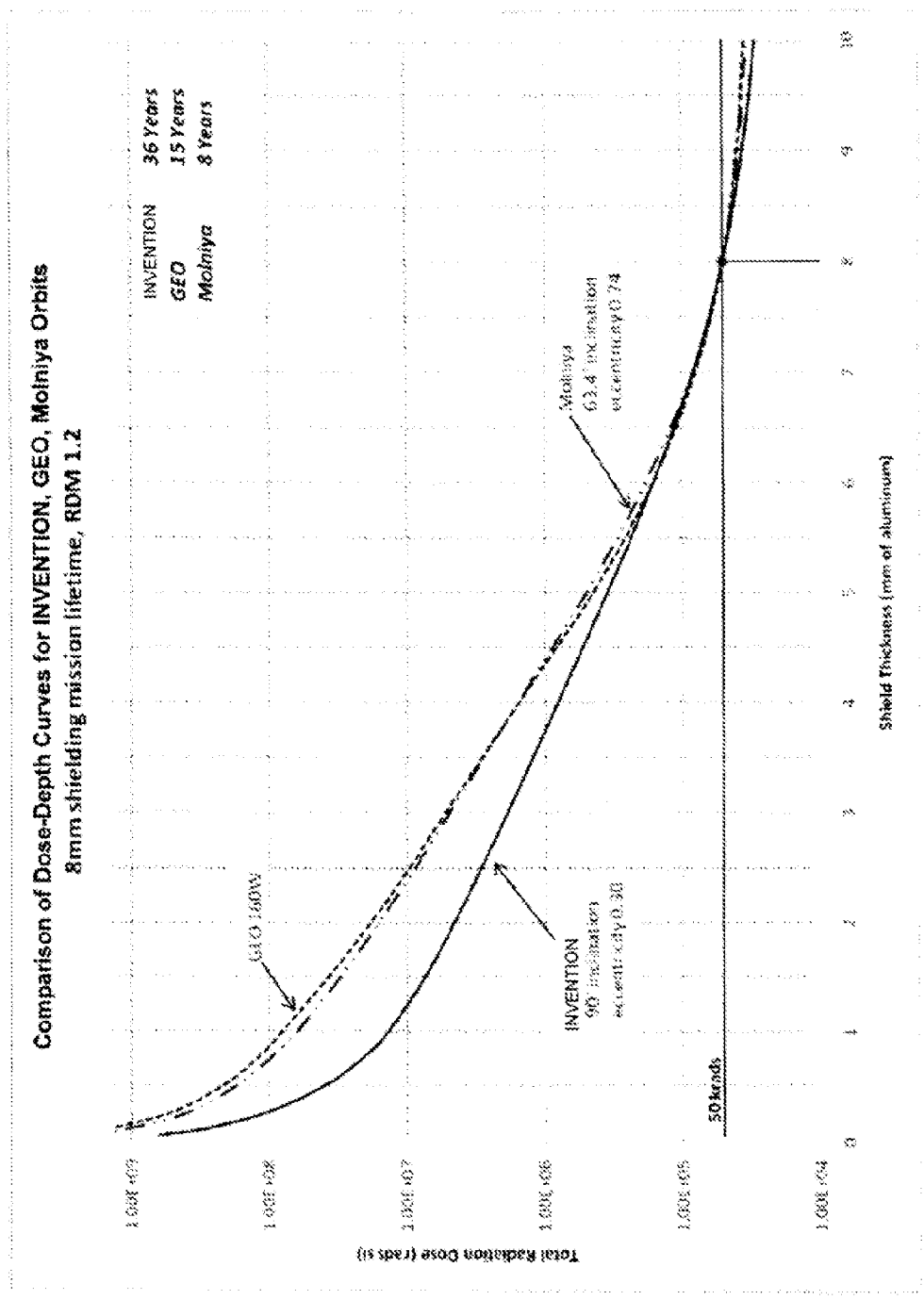

FIGS. 7 and 8 present dose-depth curves comparing three orbits: a 90° inclination/0.3 eccentricity orbit in the manner of the invention, a GEO 160 W orbit (i.e. a geosynchronous orbit sitting at 160° West) and a classic Molniya orbit (63.4° inclination, eccentricity of 0.74). During a 15 year design life of a typical GEO satellite, the total accumulated, radiation that is expected to be absorbed is 50 krads. As shown in FIG. 7, a satellite in the Molniya orbit would require a shield thickness of 11.5 mm to satisfy this requirement, while a GEO 160 W would require 8 mm of aluminum shielding. In contrast, the orbit of the invention would only require 6.5 mm. There is a significant advantage in using an orbit like that of the invention, which can use components and subsystems with flight heritage in GEO, and can achieve or exceed the design life of GEO satellites.

It is preferable to use "off the shelf" components in order to minimize costs and optimize reliability. While one could implement the invention with new components having 6.5 mm shielding, one would typically use 8 mm shielding because GEO satellites and components are the most common. As shown in FIG. 8, if one was to keep the shielding and total radiation absorbed for a GEO as a reference (i.e. a shielding of 8 mm and radiation dose of 50 krads), a satellite in the Molniya orbit will absorb this total radiation dose in 8 years, a satellite in the GEO orbit in 15 years and a satellite in a 90° inclination orbit of the invention, in 36 years. Thus, the system of the invention would be much more reliable and would have a much longer expected lifetime than a system in the Molniya orbit.

Figure 10:
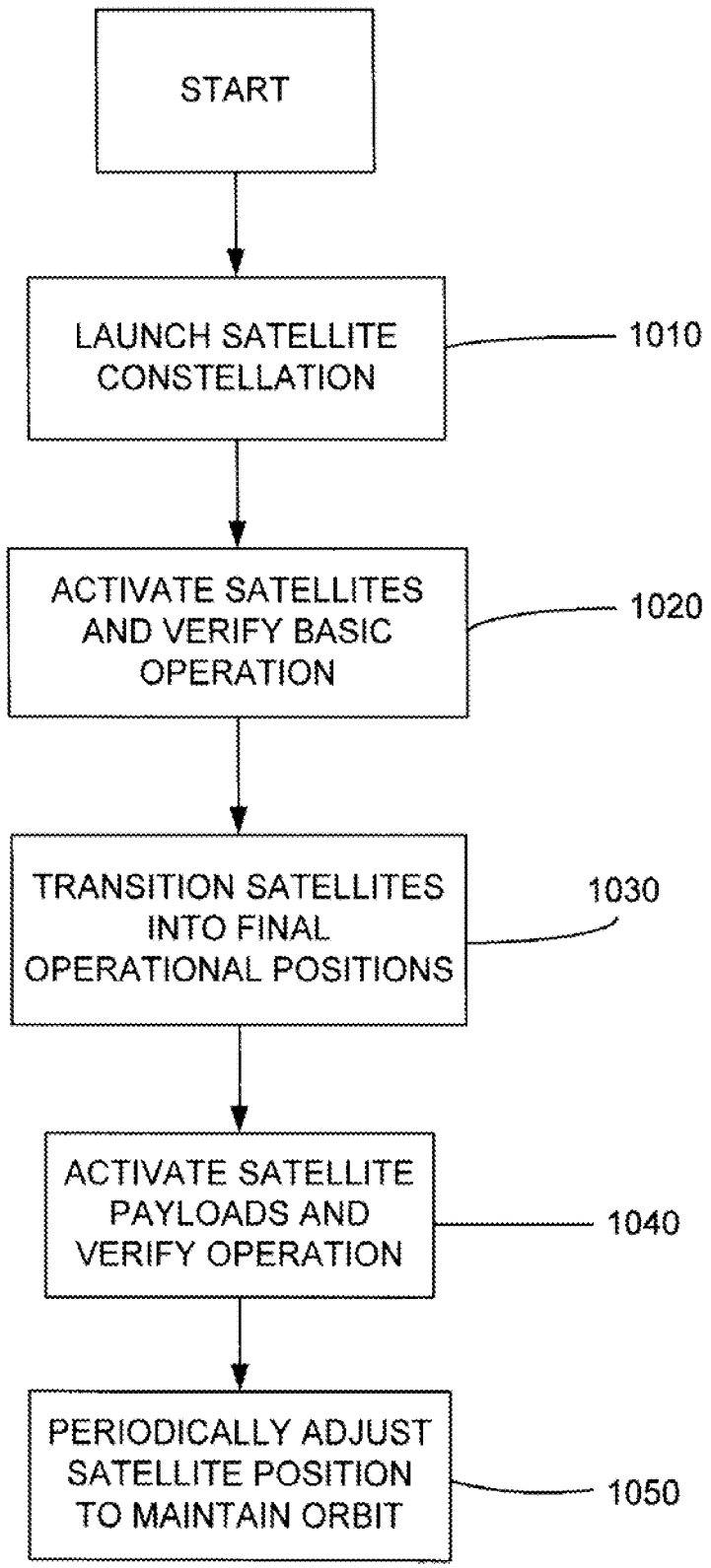
FIG. 10 presents a flow chart of an exemplary method of implementing the invention.

FIG. 10 illustrates a flowchart of an exemplary method of operating the satellite system. The method begins in block 1010, by launching the satellite constellation and deploying the satellites into orbits having the desired orbital parameters. Satellites may be launched one at a time (e.g. one satellite per launch vehicle) or with multiple satellites in the same launch vehicle. In the preferred embodiment, it is desirable to have all of the satellites in the same orbital plane; in such a configuration, it is most efficient to launch all of the satellites with a single launch vehicle.

Figure 9:
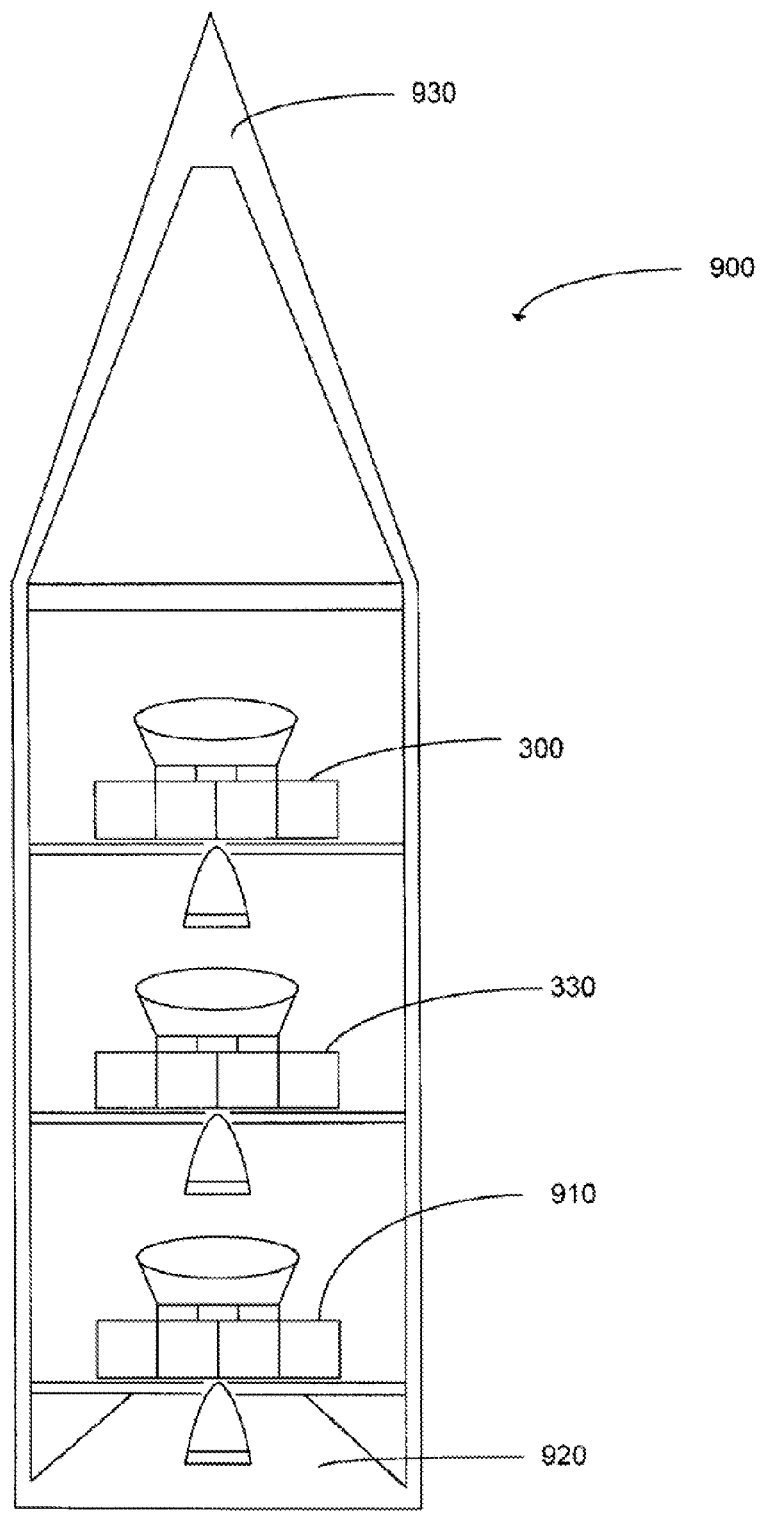
FIG. 9 presents an exemplary pay load arrangement for a launch vehicle.

FIG. 9 presents a cross-sectional view of an exemplary payload 900 for a launch vehicle (not shown) containing three satellites 300, 330, 910. The launch vehicle will include a sufficient number of propulsion stages, of sufficient capacity, to carry the satellites into the desired orbit, or into a position from which the satellites can reach then operational orbits (i.e. two propulsion stages, three stages, etc.). The launch vehicle may carry multiple satellites into a low-altitude parking orbit, from which the satellites propel themselves into the operational orbit, or it may launch the satellites directly into their operational orbit.

FIG. 9 presents three satellites 300, 330, 910 stacked on a payload adaptor 920 within a payload faking 930. While only two satellites are required to provide the coverage of the circumpolar region, it may be desirable to launch a third, redundant satellite into the orbit at the same time as the two primary satellites. Thus, the third, redundant satellite could be commissioned if either of the primary satellites fails for some reason. Of course, more or fewer satellites than three, could be arranged within the payload faking.

As will be described with respect to FIG. 12, each satellite 300, 330, 910 will include a communications system, a control system and a propulsion system. Regardless of what configuration of launch vehicle is used, these systems allow the satellites 300, 330, 910 to communicate with the Gateway 610, and position themselves into their final operation orbits, with the desired nodal separation. In the case of a two satellite constellation with the satellites in the same plane, the two satellites will have a nodal separation of 180°.

Referring again to FIG. 10, once the satellite constellation has been launched by the launch vehicle, the satellites may be activated and a commissioning/testing procedure of the basic systems performed 1020. This commissioning/testing procedure may include deploying antennas and rotating the satellite 300, 330, 910 so that the antenna is pointed in the appropriate direction, deploying solar panels, energizing processors and electronic systems, booting-up software systems, and verifying operation of all basic systems and subsystems. It may also be necessary to perform trouble-shooting and/or corrective measures as part of this procedure.

Once the basic systems and subsystems have been activated and their operation verified, the satellites 300, 330, 910 may be transitioned into their final orbital positions 1030. As described above, this may comprise the satellites 300, 330, 910 simply propelling themselves into the correct nodal separations, if they were launched into the same operational orbit. Alternatively, if the satellites 300, 330, 910 were launched into a parking orbit, they may be required to consume a much larger quantity of fuel to propel themselves into then operational orbit and nodal separation.

With the satellites 300, 330, 910 now in their final orbital positions, the payloads may be activated, commissioned and tested 1040. This would be done in much the same manner as the activation, testing and commissioning of the satellites' basic systems described above, i.e. deploying any necessary antennas or sensors, energizing processors and electronic systems, booting-up software systems, and verifying operation of all the payload systems and subsystems. Of course, trouble-shooting and/or corrective measures may also be performed as part of the payload commissioning procedure.

The satellites 300, 330, 910 are now in an operational mode. Operation of the payload will be determined completely by the nature of the payload. In the case of an Earth observation payload such a weather-monitoring system, this may comprise the operation of imaging instruments, and the transmission of observation data from the satellite to the Gateway.

With all of the satellite systems and payload operational, the only remaining concern is to maintain the position of the satellite 300, 330, 910 in the orbit of interest 1050. This can be effected in the manner described above under the heading "Orbit Control". Satellite position information may be determined by the satellite 300, 330, 910, a Gateway 610 or some other control center. Typically, satellite position information may be calculated from global positioning system (GPS) data and/or from other satellite telemetry.

Optionally, certain systems and subsystems may be deactivated in the course of the satellites' orbits, for example, to conserve power or to protect instrumentation. If, for example, the payload comprises scientific instruments for monitoring weather in the Northern circumpolar region it may be desirable to deactivate the payload systems while the satellite 300, 330, 910 is in the Southern hemisphere, re-activating it as it re-enters the region of interest. It may be desirable to keep the basic satellite subsystems operational at all times, so that it may continue to receive and transmit data related to its health, status and control.

Figure 11:
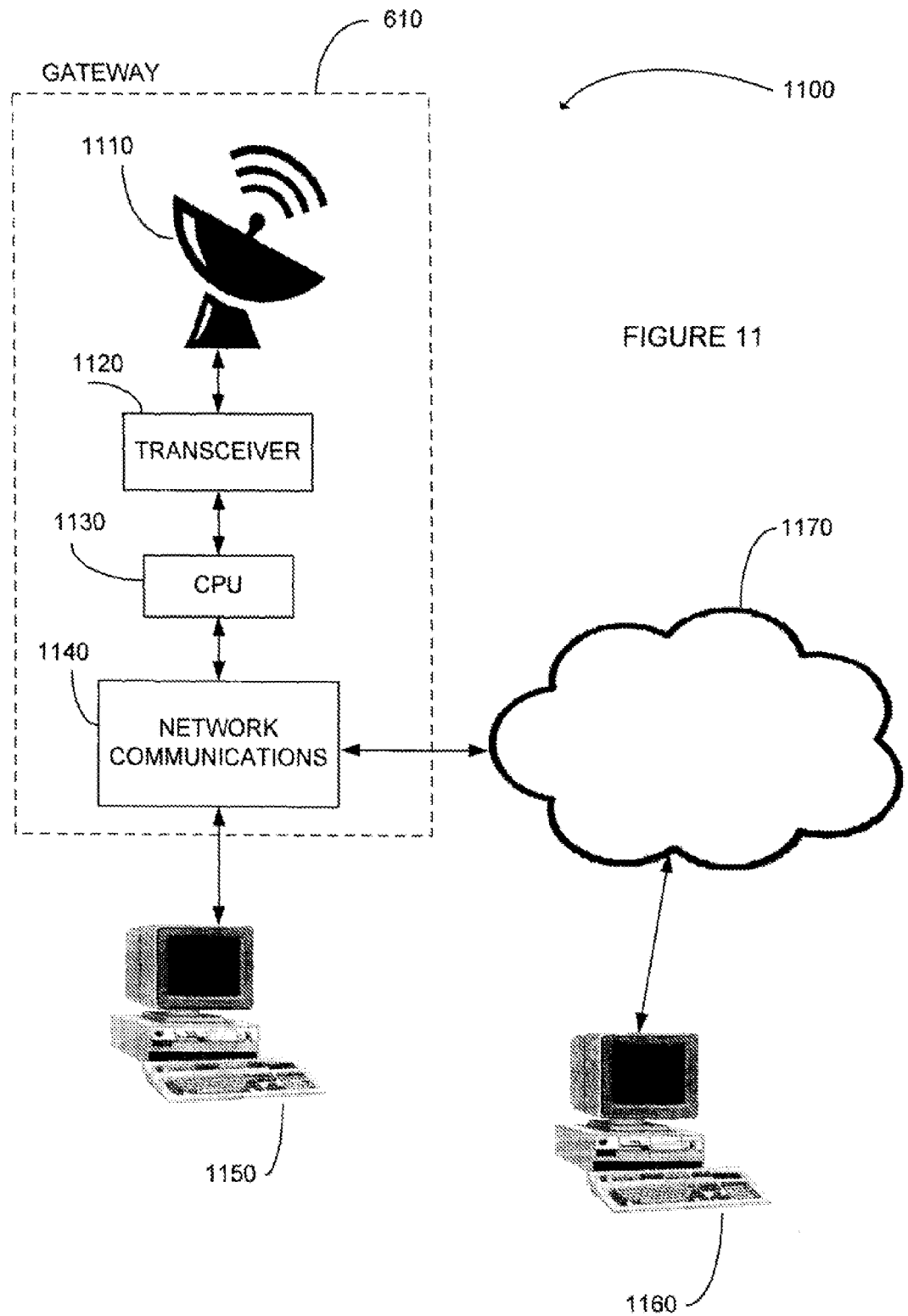
FIG. 11 presents a block diagram of an exemplary Gateway in an embodiment of the invention.

FIG. 11 illustrates a simplified block diagram of an exemplary Gateway system 1100 for communicating with the satellites 300, 330, 910. The communication signals may include operational/control signals and payload related signals. In the case of a scientific payload, the payload related signals may include control signals transmitted to instruments, and observation/monitoring data received from the instruments. The Gateway system 1100 may be modified to receive and present other types of information, and may be used in conjunction with one or more computers, servers, networks and other related devices.

As shown in FIG. 11, the Gateway system 1100 may include an antenna 1110, a transceiver 1120, a processing unit or system 1130, and a network communications system 1140.

The antenna 1110 is designed to receive and transmit, signals at the desired communication frequencies. Typically, the antenna 1110 will be a highly-directional, tracking antenna, given the high altitudes of the satellites and the low signal levels involved. Other antenna designs such as non-tracking antennas may be used if the application is changed.

The Gateway transceiver 1120 consists of a receiver portion for receiving data from the satellites and preparing it for the CPU 1130, and a transmission portion for process data from the CPU 1130, preparing it for transmission to the satellites 300, 330, 910 via the antenna 1110. The transmitting portion of the transceiver 1120 may, for example, multiplex, encode and compress data to be transmitted to the satellites 300, 330, 910, then modulate the data to the desired transmission frequency and amplify it for transmission. Multiple channels may be used, error correction coding, and the like. In a complementary manner, the receiver portion of the transceiver 1120 demodulates received signals and performs any necessary demultiplexing, decoding, decompressing, error correction and formatting of the signals from the antenna, for use by the CPU 1130. The antenna and/or receiver may also include any other desired switches, filters, low-noise amplifiers, downconverters (for example, to an intermediate frequency), and other components.

A local user interface 1150 is also shown in FIG. 11. The geographic positions of the Gateway(s) 610 may be chosen to minimize the number of Gateways required. As a result, the Gateway(s) 610 may not be in a geographic location that is convenient for the satellite operators and/or parties receiving the payload data. Thus, the Gateway(s) 610 will typically be provided with network communication facilities 1140 so that remote computers 1160 may be used to access the system over the Internet or similar networks 1170.

Figure 12:
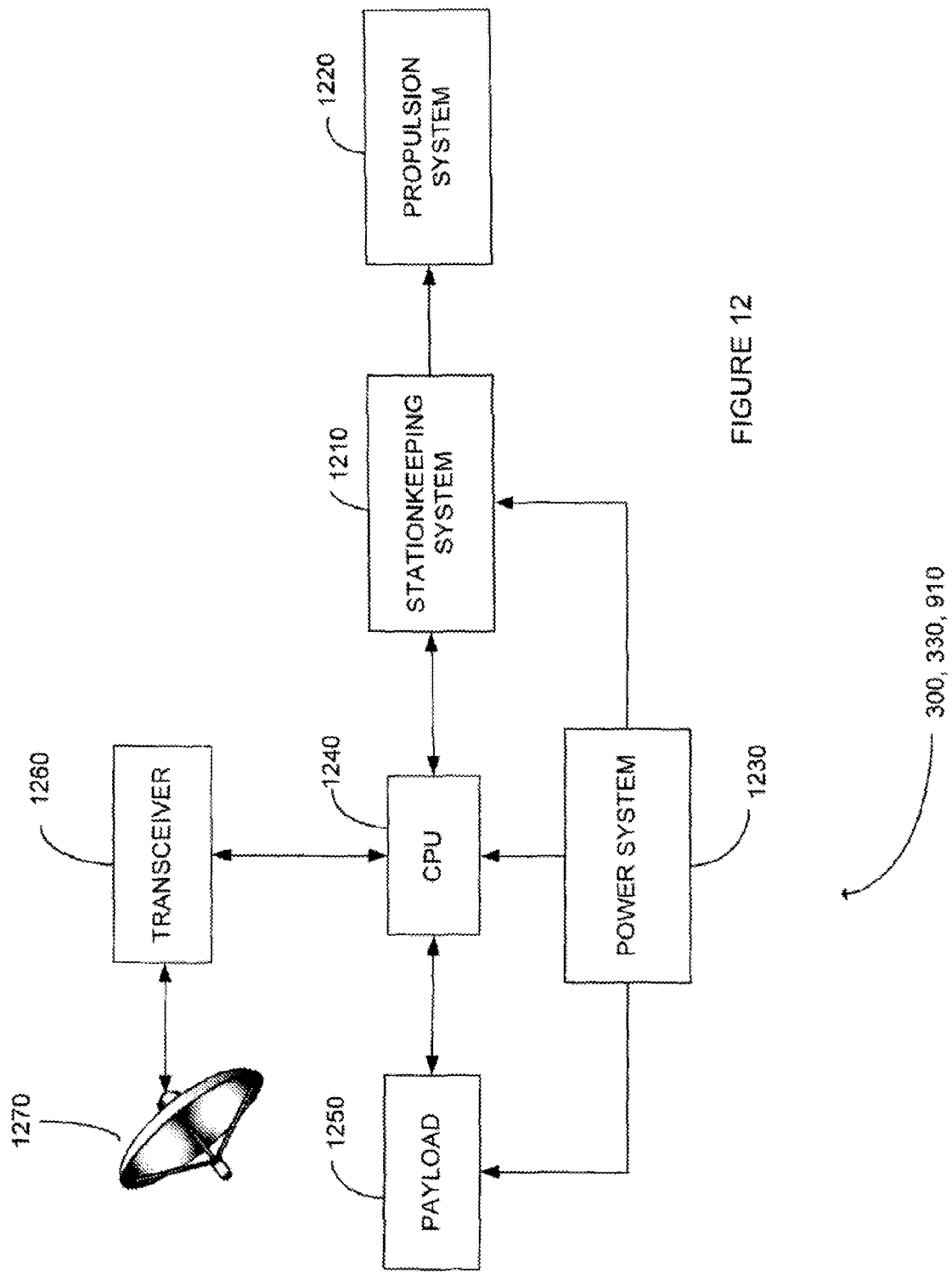
FIG. 12 presents a block diagram of an exemplary satellite in an embodiment, of the invention.

FIG. 12 illustrates a simplified block diagram of a satellite 300, 330, 910 which may be used in an exemplary embodiment of the invention. As shown, the satellite 300, 330, 910 may include a stationkeeping system 1210, a propulsion system 1220, a power system 1230, a communications system, a computer processing system 1240 and a payload 1250. The communications system will typically consist of a transceiver 1260 and an antenna 1270. Of course, other components and arrangements may be used to implement the invention, including, for example, redundant and back-up components.

The stationkeeping subsystem 1210 is responsible for maintaining the satellite's orbit. Accordingly, the stationkeeping subsystem 1210 may calculate and/or receive attitude and/or orbit adjustment information, and may actuate the propulsion system to adjust the satellite's attitude and/or orbit. Maintaining the orbit may also include maintaining the desired nodal separations between itself and the other satellites within the satellite constellation. The propulsion system 1220 may include for example, a fuel source (i.e. fuel and oxidant tanks) and liquid fuel rocket, or an ion-thruster system.

The power subsystem 1230 provides electrical power to all of the satellite systems and subsystems. The power subsystem 1230 may, for example, include one or more solar panels and a supporting structure, and one or more batteries.

The satellite antenna 1270 would be designed to accommodate the communications frequencies and systems required. In view of the physical size and weight constraints of the satellite, it will be much smaller than the antenna 1110 of the Gateway 610. The direction of the beam of antenna 1270 is controlled by mechanically steering the antenna or electronically steering the antenna beam. Alternatively, the satellite attitude may be controlled to steer the antenna.

Similarly, the satellite transceiver 1280 is designed to be complementary to that of the Gateway 610, consisting of a receiver portion for receiving data from the Gateway 610 and preparing it for the CPU 1240, and a transmission portion for process data Horn the CPU 1240, preparing it for transmission to the Gateway 610 via the antenna 1270. The transmitting portion of the transceiver 1260 may, for example, multiplex, encode and compress data to be transmitted, then modulate the data to the desired transmission frequency and amplify it for transmission. Multiple channels may be used, error correction coding, and the like. The receiver portion of the transceiver 1260 demodulates received signals and performs any necessary demultiplexing, decoding, decompressing, error correction and formatting of the signals from antenna 1270, for use by the satellite CPU 1240. The antenna and/or receiver may also include any other desired switches, filters, low-noise amplifiers, downconverters (for example, to an intermediate frequency and/or baseband), and other components.

The CPU system 1240 of the satellite 300, 330, 910 typically receives signals used for operation of the attitude and orbit control systems. It also receives control signals for operation of the payload 1250, and processes payload data for transmission to the Gateway 610. It may also manage activation and deactivation of the various subsystems as the satellite 300, 330, 910 passes into and out of the geographic region of interest.

Options and Alternatives

In addition to the meteorological implementations described above, the system of the invention may be applied to at least the following applications:

1. Military UAVs: the current requirement for Military UAVs specifies that an uplink rate of 10-20 Mbps (megabits per second) be supported. This can be accommodated by the system of the invention throughout the circumpolar region. The classic Tundra system requires more than two satellites to have continuous coverage, of this area;

2. Cross polar air traffic currently must switch from geostationary communications to HF (high frequency) radio communications while going over the poles. The system of the invention could support broadband communications, navigation and surveillance with aircraft crossing the pole. There are currently 700 aircraft per month using polar routes and continuous coverage over the north circumpolar region is required to improve safety and efficiency of air traffic in the area;

3. Satellite based navigation augmentation: accuracy, integrity and reliability of satellite based navigation systems (e.g. GPS) can be improved by augmenting or overlaying their signals with those from other satellites which broadcast error corrections and integrity information. This is particularly important for air traffic. Two such systems are in place, one in the United States (Wide Area Augmentation System) and one in Europe (European Geostationary Navigation Overlay System). Both are based on geostationary satellites systems and neither covers the entire circumpolar region where there is a recognized need for improved navigation;

4. Earth Observation; In addition to meteorological observations, other Earth observation payloads can perform well in the described orbits and provide monitoring of either circumpolar regions including hyperspectral sounders and ocean colour radiometry;

5. Space Situational Awareness: These payloads can detect space hazards such as debris and asteroids as well as oilier satellites which may be considered hazards;

6. Space Weather; The orbits of the invention can support space weather payloads which measure such factors as solar radiation. Van Allen belt radiation, and the Earth's ionosphere;

7. Inter Satellite Link (ISL): The ISL links is a derived feature of this invention. The satellite will be capable of providing ISL links to other satellites that will behave as a relay station to communicate with the terrestrial infrastructure;

8. Two Orbital Planes: For inclinations less than 90° the satellites will be capable of operating in a dual orbital plane. With a dual orbital plane, a single ground track is possible which can enhance the coverage of a particular area and give flexibility in placement of the ground infrastructure; and 9. Smaller Circumpolar Regions: The parameters of the invention can easily be optimized for smaller geographic regions such as latitudes above 65° or 70°. It would be preferable to reduce the orbital eccentricity to accommodate such changes in coverage.

CONCLUSIONS

One or more currently preferred embodiments have been described by way of example. It will be apparent to persons skilled in the art that a number of variations and modifications can be made without departing from the scope of the invention as defined in the claims. For example, the selection of the inclination is dependant on the tradeoffs between the required service area, the amount of fuel on the spacecraft and the launch mass of the payload. These parameters can be optimized to accommodate different priorities, without departing from the concept of the invention.

The method steps of the invention may be embodied in sets of executable machine code stored in a variety of formats such as object code or source code. Such code may be described generically as programming code, software, or a computer program for simplification. The embodiments of the invention may be executed by a computer processor or similar device programmed in the manner of method steps, or may be executed by an electronic system which is provided with means for executing these steps. Similarly, an electronic memory medium such computer diskettes, hard drives, thumb drives, CD-ROMs. Random Access Memory (RAM), Read Only Memory (ROM) or similar computer software storage media known in the art, may be programmed to execute such method steps.

All citations are hereby incorporated by reference.

What is claimed is:

1. A satellite system for Earth observation and communications, comprising:
a constellation of two satellites, which together provide continuous coverage of approximately 20° elevation or greater throughout a geographic service area above 60° latitude;
each satellite having an orbital inclination approximately between 70° and 90° and an orbital eccentricity approximately between 0.275 and 0.45; and
a base station for transmitting to, and receiving signals from, said constellation of two satellites; wherein the orbital eccentricity and the orbital inclination are calculated to achieve an apogee over a polar region of interest, and a perigee which minimizes exposure to Van Allen proton belts.

2. The system of claim 1, wherein the orbital inclination is approximately between 80° and 90°.

3. The system of claim 1, wherein the orbital eccentricity is chosen to have a sufficiently high apogee over the geographic service area to provide coverage for the required period of its orbit.

4. The system of claim 1, wherein the orbital eccentricity is approximately between 0.30 and 0.34.

5. The system of claim 3, further comprising a third satellite.

6. The system of claim 5, wherein the satellites have an orbital period of approximately 24 hours.

7. The system of claim 6, wherein the base station is operable to track the satellites across the sky, and the base station is operable to handoff communications between the satellites as they move across the sky.

8. The system of claim 7, wherein the satellites travel in the same orbital plane.

9. The system of claim 1 wherein the orbital eccentricity is decreased to achieve continuous coverage of a smaller circumpolar region, to include only latitudes greater than 65°.

10. The system of claim 1, wherein the orbital eccentricity is decreased to achieve continuous coverage of a smaller circumpolar region, to include only latitudes greater than 70°.

11. The system of claim 1, wherein the argument of the perigee is about 270°.

12. The system of claim 1, wherein the argument of the perigee is about 90° so that the apogee is in the southern hemisphere and the perigee is in the northern hemisphere.

13. A method of operation for a satellite system satellite system for Earth observation and communications, comprising:
providing a constellation of two satellites, which together provide continuous coverage of approximately 20° elevation or greater throughout a geographic service area above 60° latitude, each satellite having an orbital inclination approximately between 70° and 90° and an orbital eccentricity approximately between 0.275 and 0.45; and
providing a base station for transmitting to and receiving signals from said constellation of two satellites.

14. The method of claim 13, wherein the orbital inclination is approximately between 80° and 90°.

15. The method of claim 13, wherein the orbital eccentricity is approximately between 0.30 and 0.34.

16. The method of claim 15, wherein the satellites have an orbital period of approximately 24 hours.

17. The method of claim 16, wherein the satellites travel in the same orbital plane.

18. The method of claim 17, wherein phasing of the satellites is such that the time between their respective apogees is approximately the orbital period divided by the number of satellites in the constellation.

19. A satellite comprising:
communication means for transmitting and receiving signals to and from a base station;
an Earth observation and communications payload for serving a geographic service area above 60° latitude, with an elevation of approximately 20° or greater; and flight control means for controlling an orbit to have an orbital inclination approximately between 70° and 90° and an orbital eccentricity approximately between 0.275 and 0.45.

20. The satellite of claim 19, wherein the orbital inclination is approximately between 80° and 90°.

21. The satellite of claim 19, wherein the orbital eccentricity is approximately between 0.30 and 0.34.

22. The satellite of claim 21, wherein the satellite has an orbital period of approximately 24 hours.

23. The satellite of claim 22, wherein the satellite travels in the same orbital plane as a second satellite in the same orbit.

24. The satellite of claim 23, wherein the satellite has a phasing such that the time between its apogee and the apogee of the second satellite in the same orbit, is approximately one half the orbital period.

* * * * *